United States Patent
Zhang et al.

(10) Patent No.: US 9,106,503 B1
(45) Date of Patent: Aug. 11, 2015

(54) METHOD AND APPARATUS FOR RECOVERING TIME-DOMAIN HYBRID MODULATED QAM SIGNALS

(71) Applicant: FUTUREWEI TECHNOLOGIES, INC., Plano, TX (US)

(72) Inventors: Zhuhong Zhang, Ottowa (CA); Chuandong Li, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/308,315

(22) Filed: Jun. 18, 2014

(51) Int. Cl.
*H04L 27/01* (2006.01)
*H04L 27/38* (2006.01)
*H04J 14/06* (2006.01)

(52) U.S. Cl.
CPC ............... *H04L 27/38* (2013.01); *H04J 14/06* (2013.01)

(58) Field of Classification Search
CPC ......... H04L 27/01; H04L 27/06; H04L 27/22; H04L 25/03019
USPC .................. 375/268, 269, 320, 322, 329, 332
See application file for complete search history.

(56) References Cited

U.S. PATENT DOCUMENTS

2010/0226423 A1* 9/2010 Chen et al. .................... 375/232

* cited by examiner

*Primary Examiner* — Kevin Kim

(57) ABSTRACT

A method for recovering a quadrature amplitude modulated (QAM) signal is disclosed. The method includes receiving a QAM signal at a demultiplexers, where the QAM signal comprises multiple modulation schemes, splitting the QAM signal into k branches, where k is the number of QAM modulation schemes of the signal, passing the branch having the lowest order QAM modulation scheme to a first equalizer for recovering and tracking polarization and compensating polarization mode dispersion (PMD), updating a tap updating algorithm with a recovery value determined by the first equalizer, and recovering and tracking polarization and compensating PMD for all other branches based on the recovery value.

20 Claims, 3 Drawing Sheets

METHOD AND APPARATUS FOR RECOVERING TIME-DOMAIN HYBRID MODULATED QAM SIGNALS

FIELD

The present invention generally relates to the field of quadrature amplitude modulation (QAM). More specifically, the present invention relates to time-domain hybrid modulated QAM signal recovery.

BACKGROUND

In optical communications, many modulation schemes have been used to transport data. On-Off keying (OOK) is one modulation scheme that has been used, where data is encoded using signal intensity variation. OOK introduces strong characteristic tones in the signal frequency domain, which can be detected as periodic intensity variations in the signal. To detect the signals, a conventional clock recovery scheme is used to obtain the timing information in the tones, such as by filtering the detected signal intensities using a narrow band pass filter.

Phase Shift Keying (PSK), Differential PSK (DPSK), Quadrature PSK (QPSK), and Differential QPSK (DQPSK) are other modulation schemes that have been used more recently. In such modulation schemes, the data is encoded using signal phase variation. Quadrature phase based modulation has been widely used for many years to achieve high spectrum efficiency in radio frequency (RF) communications systems, including polarization multiplexed optical communications systems.

In polarization multiplexed optical communications systems, two signals are carried on one wavelength at two orthogonal linear polarization states, where one signal is modulated in one of the orthogonal polarization states and the other signal is modulated in the other orthogonal polarization state. The quadrature phase modulation in polarization multiplexed optical communications systems can achieve about a fourfold improvement in transmission efficiency, e.g. in comparison to other modulation schemes.

SUMMARY

In one embodiment, a method for recovering a quadrature amplitude modulated (QAM) signal is disclosed. The method includes receiving a QAM signal at a demultiplexers, where the QAM signal comprises multiple modulation schemes, splitting the QAM signal into k branches, where k is the number of QAM modulation schemes of the signal, passing the branch having the lowest order QAM modulation scheme to a first equalizer for recovering and tracking polarization and compensating polarization mode dispersion (PMD), updating a tap updating algorithm with a recovery value determined by the first equalizer, and recovering and tracking polarization and compensating PMD for all other branches based on the recovery value.

According to other embodiments, the method continues by passing each of the compensated branches to phase correction units, recovering and tracking the carrier phase of the lowest order QAM signal from a first phase correction unit to derive an error signal, and recovering and tracking the carrier phase of the remaining QAM signal branches based on the error signal.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
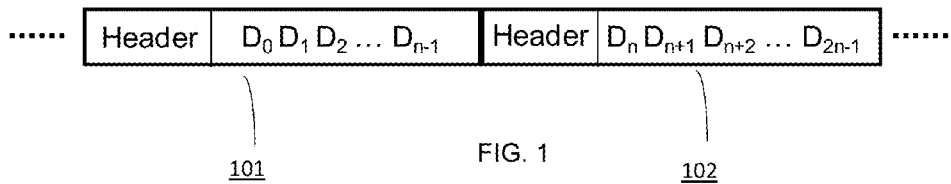
FIG. 1 is a block diagram of exemplary transmission data blocks for time domain hybrid QAM.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof may be disclosed in a figure herein describing the operations of this method, such steps and sequencing are exemplary. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Recovering Time-Domain Hybrid Modulated QAM Signals

A hardware-efficient master and slave structured polarization and carrier phase recovery circuit for recovering time-domain hybrid QAM signals is disclosed herein. A master circuit processes the lowest order QAM and derives an error signal for converging equalizer and tracking carrier phase. One or more slave circuits processes higher order QAM signals by directly applying the equalization and recovered carrier phase derived from the lowest order QAM to the higher order QAM signal. As such, continuous rate adaptive transmissions using time domain hybrid may increase spectral efficiency.

As depicted in FIG. 1, transmission data may be partitioned into contiguous blocks, with training symbols inserted into the header of each block, according to some embodiments of the present invention. The data (e.g., data 101 and 102) is transmitted as a time domain hybrid QAM, with the data blocks being symbol interleaved (left side of FIG. 2) or block interleaved (right side of FIG. 2). Multi-input and multi-output (MIMO) equalizers configured in parallel are used to recover polarization and compensate polarization mode dispersion (PDM) of a polarization multiplexed QAM signal. According to some embodiments, the hardware complexity is proportional to not only the order of QAM signal, but also the algorithm of the equalizer.

Figure 2:
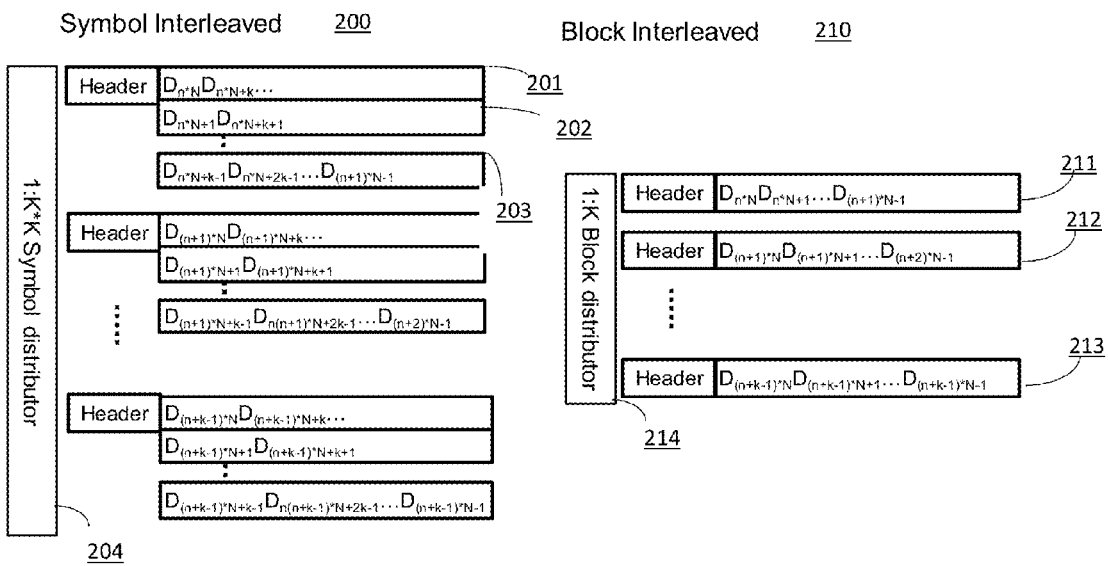
FIG. 2 is a block diagram of exemplary symbol interleaved and block interleaved data distribution for time domain hybrid QAM.

For symbol interleaved and block interleaved signals, as depicted in FIG. 2, the received digital samples are distributed to k branches based on its QAM order. For example, the symbol interleaved signal 200 arranges multiple samples per header (e.g., samples 201, 202, and 203) into a single data stream using a 1:k*k Symbol distributor 204. A block interleaved structure 210 may also be utilized, where each sample (e.g., samples 211, 212 and 213) is distributed with a header using 1:k Block distributor 214. According to some embodiments, both MIMO equalization and phase recovery may be performed for a symbol interleaved signal, while only MIMO equalization may be performed for a block interleaved signal due to rapid changes in phase.

Figure 3:
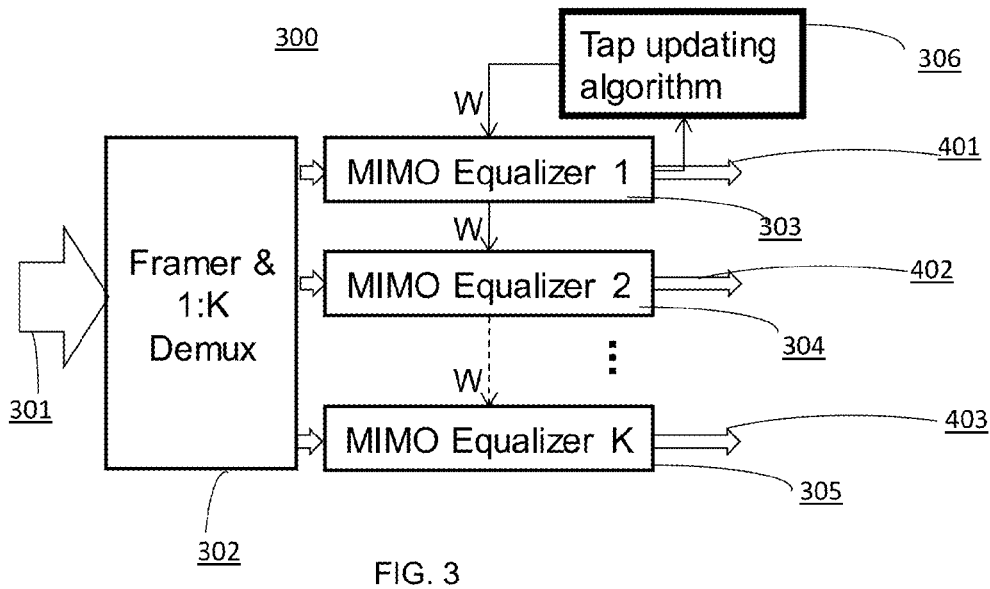
FIG. 3 is a block diagram of an exemplary master-slave structured multiple-input-multiple-output (MIMO) equalizer according to embodiments of the present invention.

With regard now to FIG. 3, exemplary master-slave structured multiple-input-multiple-output (MIMO) equalizers for recovering and tracking polarization and compensating polarization mode dispersion (PMD) are depicted according to embodiments of the present disclosure. A digital sample steam 301 is framed and de-multiplexed to k branches at demultiplexer 302 for a signal comprising k modulation schemes. For example, k=3 when a signal comprises QPSK, 8QAM, and 16QAM modulation schemes. The k branches from demultiplexer 302 output frames to one of k MIMO equalizers (e.g., MIMO equalizers 303, 304, and 305) and processed in parallel. One of the k branch MIMO equalizers (e.g., MIMO equalizer 303) is a master equalizer and has tap coefficient (W) updating circuit 306. The master equalizer processes the lowest order QAM to derive an error signal for recovering and tracking polarization and compensating PMD. Rather than calculating a new tap coefficient for each branch, the remaining k−1 branches equalizers are configured as slaves. The slave equalizers use the same W value as the master equalizer to compensate for error. In other words, tap updating is performed based only on the lower order QAM signal of the master equalizer.

With this master-slave structured parallel MIMO, hardware used for updating MIMO is reduced to at least 1/k of a conventional updating circuit for a k QAM signal hybrid. Since samples of the lowest order QAM modulation are being distributed to the master equalizer, the tap updating circuit is implemented with the lowest state of error signal calculation and achieves substantial reduced hardware complexity. According to some embodiments, the equalized signals 401, 402 and 403 are output for phase recovery (see FIG. 4).

Figure 4:
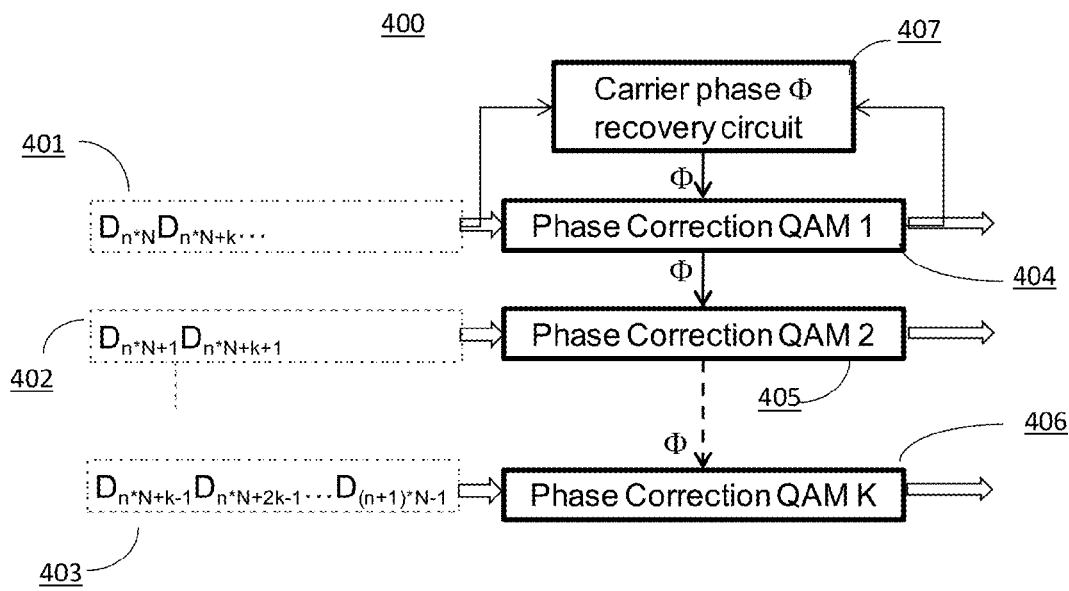
FIG. 4 is a block diagram of an exemplary master-slave structured carrier phase recovery circuit according to embodiments of the present invention.

With regard to FIG. 4, an exemplary master-slave carrier phase recovery unit 400 for recovering and tracking carrier phase is depicted according to embodiments of the present disclosure. The output (e.g., output 401, 402 and 403) of MIMO equalizers (e.g., MIMIO Equalizers 303, 304, and 305) are passed to phase correction QAMs (e.g., Phase Correction QAM 404, 405, and 406) and processed in parallel. Carrier phase recovery circuit (CR) 407 recovers the lowest order QAM signal from a master Phase Correction QAM (e.g., Phase Correction QAM 404) to derive an error signal for recovering and tracking carrier phase. The remaining Phase Correction QAMs (e.g., Phase Correction QAMs 405 and 406) are configured as slaves and use the error signal determined by CR 407 using the lowest order QAM signal for error compensation.

The hardware complexity of the CR is reduced to as least 1/k of conventional carrier recovery circuit for a k QAM signal hybrid. Carrier phase recovery circuit is required to recover and track phase and frequency changes of received signal. Since phase variation is much faster than polarization, block interleaved time domain hybrid QAM has to employ conventional carrier recovery circuits, either a digital phase lock loop or Viterbi phase recovery. A carrier phase Φ is recovered by CR based on digital samples of the lowest order QAM modulation and applied to all QAM samples. Because samples that have lowest order QAM modulation being used for recovering phase, hardware complexity is further reduced.

Figure 5:
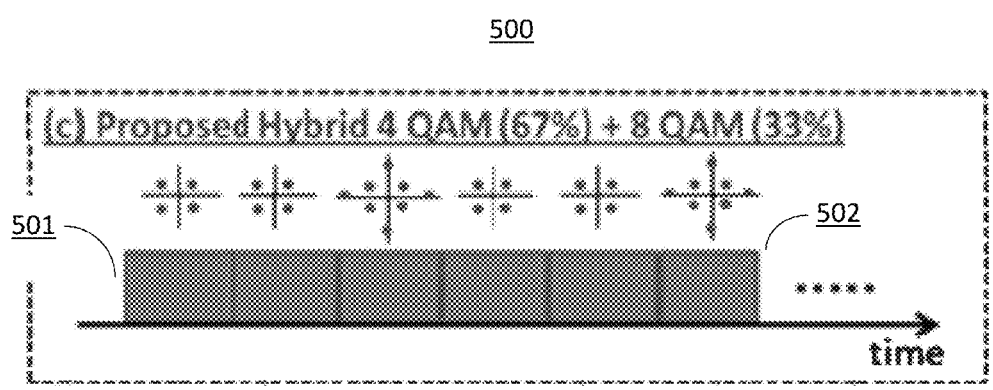
FIG. 5 is a constellation diagram of an exemplary hybrid QAM transmission (4 QAM and 8 QAM) according to embodiments of the present invention.

With regard to FIG. 5, an exemplary constellation diagram of a hybrid QAM transmission (4QAM and 8 QAM) is depicted according to embodiments of the present invention. Each rectangle represents a data symbol on the horizontal axis (time domain). As depicted, a 4 QAM has 4 possible symbols (used 67% of the time), and an 8 QAM signal has 8 possible symbols (used 33% of the time), according to some embodiments of the present invention.

What is claimed is:

1. A method for recovering a quadrature amplitude modulated (QAM) signal, the method comprising:

receiving a QAM signal at a demultiplexers, wherein the QAM signal comprises a plurality of modulation schemes;

splitting the QAM signal into k branches, where k is the number of QAM modulation schemes of the signal;

passing the branch having the lowest order QAM modulation scheme to a first equalizer for recovering and tracking polarization and compensating polarization mode dispersion (PMD);

updating a tap updating algorithm with a recovery value determined by the first equalizer; and recovering and tracking polarization and compensating PMD for all other branches based on the recovery value.

2. The method of claim 1, wherein the equalizers operate in parallel.

3. The method of claim 1, wherein k=2 and the QAM signal comprises QPSK and 8QAM modulation.

4. The method of claim 1, wherein k=3 and the QAM signal comprises QPSK, 8QAM, and 16QAM modulation.

5. The method of claim 1, the QAM signal is symbol interleaved.

6. The method of claim 1, the QAM signal is block interleaved.

7. The method of claim 1, further comprising:
passing each of the compensated branches to phase correction units;
recovering and tracking the carrier phase of the lowest order QAM signal from a first phase correction unit to derive an error signal; and
recovering and tracking the carrier phase of the remaining QAM signal branches based on the error signal.

8. The method of claim 7, wherein the equalizers and phase correction units both operate in parallel.

9. The method of claim 7, wherein k=2 and the QAM signal comprises QPSK and 8QAM modulation.

10. The method of claim 7, wherein k=3 and the QAM signal comprises QPSK, 8QAM, and 16QAM modulation.

11. The method of claim 7, the QAM signal is symbol interleaved.

12. The method of claim 7, the QAM signal is block interleaved.

13. An apparatus comprising:
a plurality of equalizers configured to receiving a portion of a QAM signal, wherein the plurality of equalizers comprise a first equalizer for processing a portion of the signal having the lowest order QAM modulation scheme to recover and track polarization and compensate PMD;
a tap updating unit for updating a recovery value determined by the first equalizer and used by the other equalizers for recovering and tracking polarization and compensating PMD;
a plurality of phase correction units comprising a first phase correction unit for recovering and tracking the carrier phase of the lowest order QAM signal to derive an error signal; and
a carrier phase recovery circuit (CR) for updating the error signal determined by the first phase correction unit and used by the other phase correction units for recovering and tracking carrier phase.

14. The apparatus of claim 13, wherein the equalizers operate in parallel.

15. The apparatus of claim 13, wherein the QAM signal comprises QPSK and 8QAM modulation.

16. The apparatus of claim 13, wherein the QAM signal comprises QPSK, 8QAM, and 16QAM modulation.

17. The apparatus of claim 13, wherein the QAM signal is symbol interleaved.

18. The apparatus of claim 13, wherein the QAM signal is block interleaved.

19. The apparatus of claim 13, wherein the QAM signal is a time-domain hybrid modulated QAM signal.

20. The method of claim 7, wherein the QAM signal is a time-domain hybrid modulated QAM signal.

* * * * *